US009180856B2

(12) United States Patent
Goelet

(10) Patent No.: US 9,180,856 B2
(45) Date of Patent: Nov. 10, 2015

(54) TRANSPORTATION SYSTEM INCLUDING A HOVERING VEHICLE

(75) Inventor: John Goelet, Washington, DC (US)

(73) Assignee: LTA CORPORATION, New York, NY (US)

(*) Notice: Subject to any disclaimer, the term of this patent is extended or adjusted under 35 U.S.C. 154(b) by 0 days.

(21) Appl. No.: 13/442,039

(22) Filed: Apr. 9, 2012

(65) Prior Publication Data

US 2012/0265393 A1 Oct. 18, 2012

Related U.S. Application Data

(60) Provisional application No. 61/475,845, filed on Apr. 15, 2011.

(51) Int. Cl.
| *B60V 1/00* | (2006.01) |
| *B60V 1/04* | (2006.01) |
| *B64C 39/00* | (2006.01) |
| *B64C 39/02* | (2006.01) |
| *B60V 3/04* | (2006.01) |

(52) U.S. Cl.
CPC . *B60V 1/046* (2013.01); *B60V 3/04* (2013.01); *B64C 39/00* (2013.01); *B64C 39/02* (2013.01)

(58) Field of Classification Search
CPC ........... B60V 1/00; B64C 39/00; B64C 39/02
USPC .......................................................... 105/8.1
See application file for complete search history.

(56) References Cited

U.S. PATENT DOCUMENTS

| 3,414,076 | A |   | 12/1968 | Bertin et al. |         |
|-----------|---|---|---------|---------------|---------|
| 3,500,763 | A |   | 3/1970  | Mesnager      |         |
| 3,552,519 | A | * | 1/1971  | Wren          | 180/124 |
| 3,573,510 | A | * | 4/1971  | Otto          | 384/412 |
| 3,581,667 | A |   | 6/1971  | Bertin        |         |
| 3,669,207 | A | * | 6/1972  | Fellgett et al. | 180/168 |
| 3,675,582 | A |   | 7/1972  | Girard et al. |         |
| 3,710,727 | A | * | 1/1973  | Svensson      | 104/120 |
| 3,712,242 | A |   | 1/1973  | Bertin        |         |
| 3,797,399 | A |   | 3/1974  | Bertin et al. |         |
| 3,831,525 | A | * | 8/1974  | Burdick et al. | 104/23.2 |
| 3,841,223 | A |   | 10/1974 | Bertin        |         |

(Continued)

FOREIGN PATENT DOCUMENTS

| GB | 960636 A | * | 6/1964 | ............... B60V 1/00 |
| GB | 1229863 |   | 4/1971 | |

OTHER PUBLICATIONS

Michel, J., et al, "An Introduction to Coastal Habitats and Biological Resources for Oil Spill Response", 1992, National Oceanic and Atmospheric Administration, Chapter 5 (relevant pages attached).*

(Continued)

*Primary Examiner* — Helal A Algahaim
*Assistant Examiner* — Genna Mott
(74) *Attorney, Agent, or Firm* — Finnegan, Henderson, Farabow, Garrett & Dunner, L.L.P.

(57) ABSTRACT

A transportation system is disclosed. The transportation system has a vehicle that is self-powered and configured to generate an air cushion on a trackless lane having a substantially flat surface. The vehicle is configured to move over the substantially flat surface on the air cushion. The transportation system also has a guidance system configured to guide the vehicle between peripheries of the trackless lane.

20 Claims, 14 Drawing Sheets

(56) References Cited

U.S. PATENT DOCUMENTS

| | | | |
|---|---|---|---|
| 3,845,716 A | 11/1974 | Bertelsen | |
| 3,903,825 A * | 9/1975 | Hamy | 114/77 R |
| 4,137,986 A * | 2/1979 | Schirtzinger | 180/119 |
| 4,175,637 A | 11/1979 | Bertelsen | |
| 4,643,268 A * | 2/1987 | Jones et al. | 180/116 |
| 5,050,901 A * | 9/1991 | Zhao | 280/474 |
| 5,158,033 A * | 10/1992 | Evans | 114/289 |
| 5,248,436 A * | 9/1993 | Kovaletz | 210/693 |
| 5,460,098 A * | 10/1995 | Jackson et al. | 104/23.2 |
| 5,535,963 A | 7/1996 | Lehl et al. | |
| 5,669,308 A | 9/1997 | Gerhardt | |
| 5,909,710 A | 6/1999 | Cummins | |
| 6,216,599 B1 | 4/2001 | Cavanagh | |
| 6,257,165 B1 * | 7/2001 | Danos et al. | 114/265 |
| 6,342,011 B1 * | 1/2002 | Pokrandt et al. | 464/73 |
| 6,619,220 B1 * | 9/2003 | Ducote | 114/67 A |
| 6,781,524 B1 * | 8/2004 | Clark et al. | 340/933 |
| 6,957,610 B2 * | 10/2005 | Cummins | 105/8.1 |
| 7,207,285 B2 * | 4/2007 | Maloney et al. | 114/288 |
| 7,347,154 B2 * | 3/2008 | Evans | 114/67 A |
| 7,884,569 B2 * | 2/2011 | Ward | 320/101 |
| 8,342,772 B2 * | 1/2013 | Menzenbach et al. | 404/91 |
| 2005/0131645 A1 * | 6/2005 | Panopoulos | 701/214 |
| 2008/0115992 A1 * | 5/2008 | Scher et al. | 180/121 |
| 2009/0039044 A1 * | 2/2009 | Krause | 213/64 |
| 2010/0263955 A1 * | 10/2010 | Scher et al. | 180/129 |
| 2011/0045232 A1 * | 2/2011 | Kismarton | 428/113 |
| 2012/0325107 A1 * | 12/2012 | Wicks et al. | 105/215.2 |

OTHER PUBLICATIONS

Hovercraft, from Wikipedia [online], retrieved on: Jan. 26, 2011; retrieved from the Internet <URL: http://en.wikipedia.org/wiki/Hovercraft>; pp. 1-11.

Aérotrain, from Wikipedia [online], retrieved on Jan. 26, 2011]; Retrieved from the Internet <URL: http://en.wikipedia.org/wiki/A%C3%A9rotrain>; pp. 1-5.

\* cited by examiner

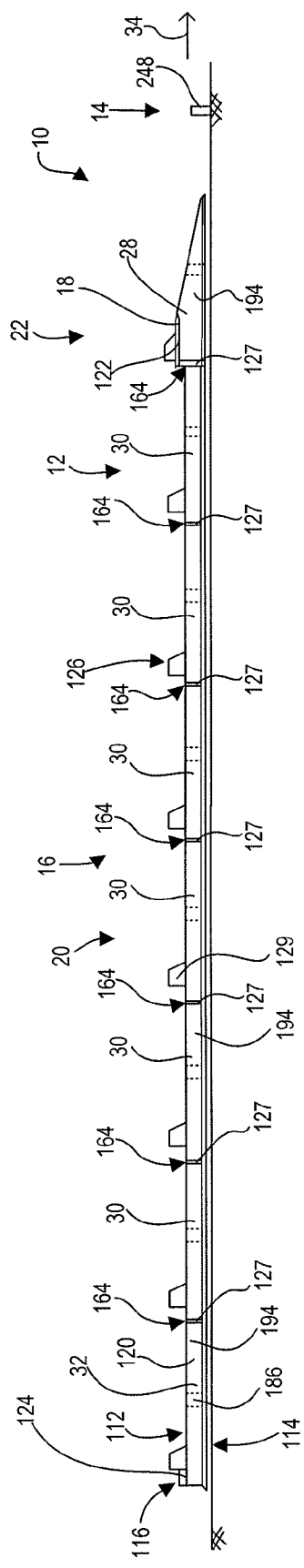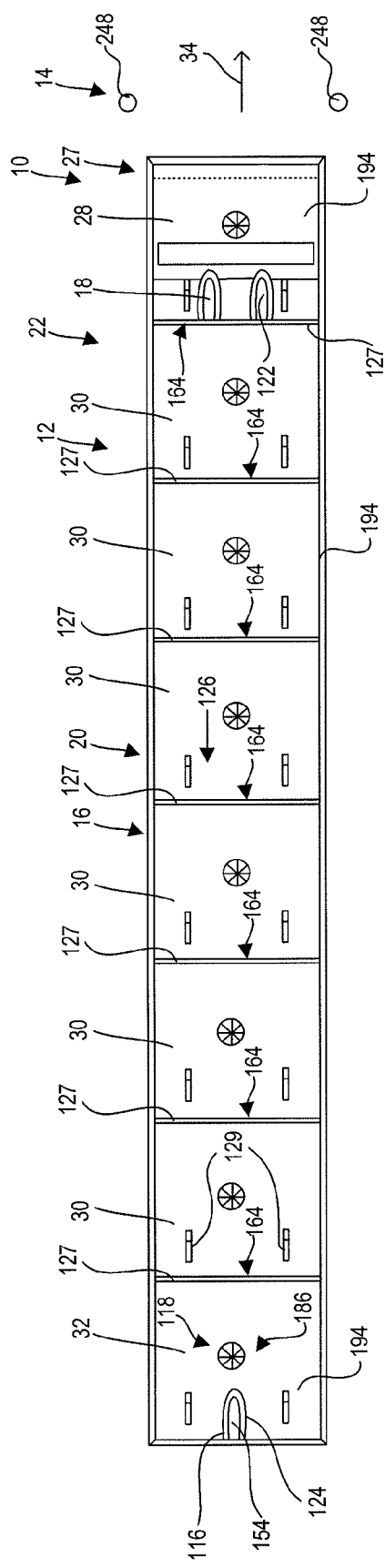

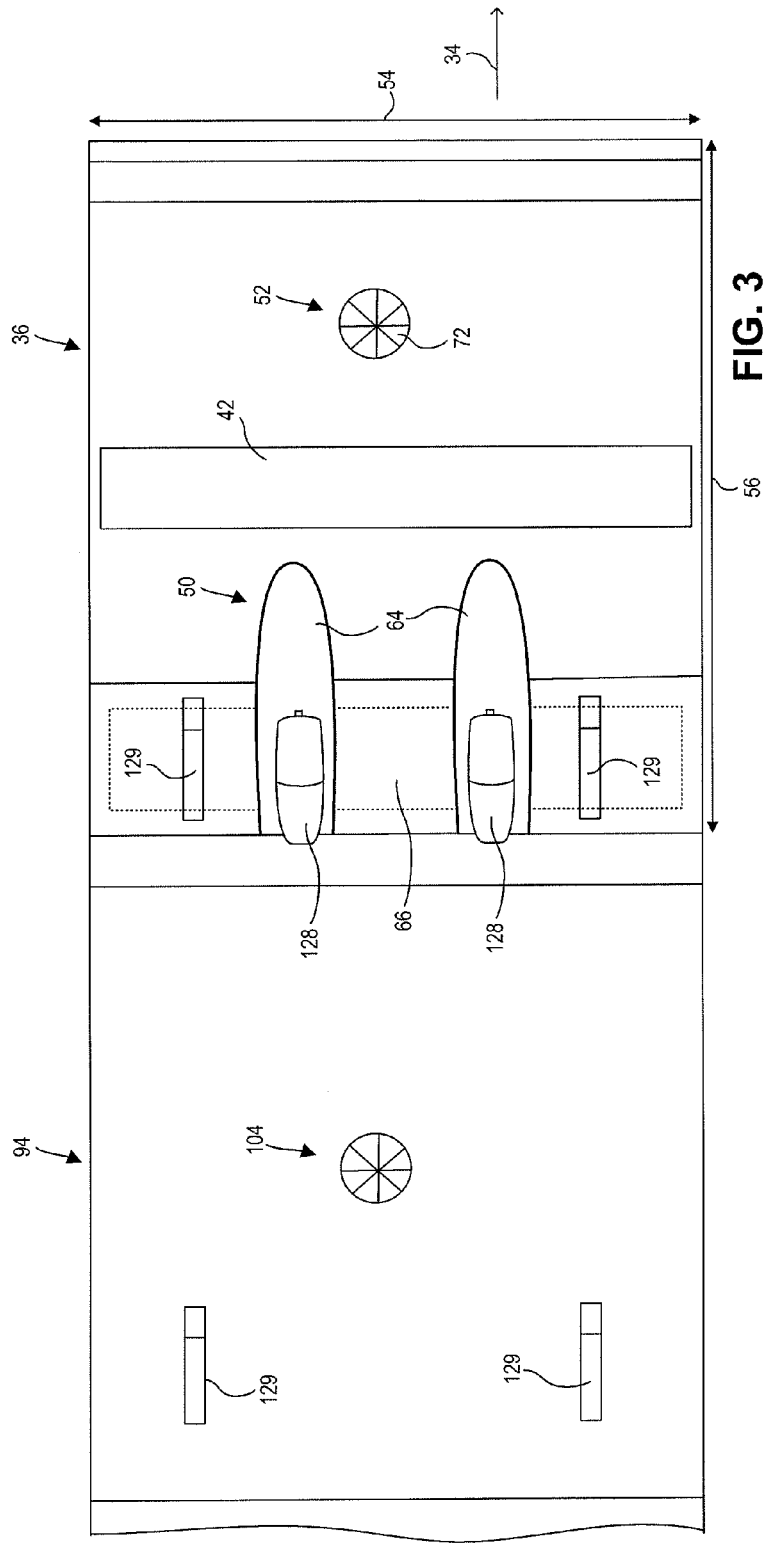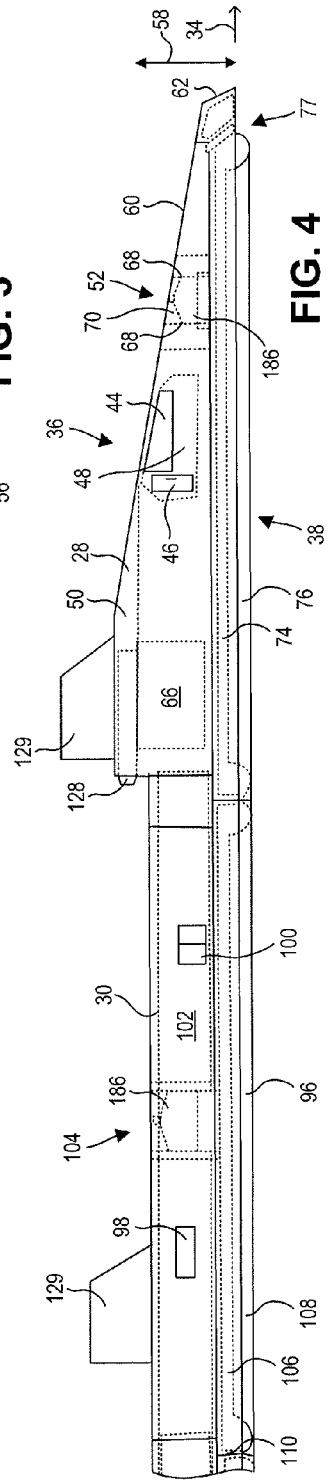

TRANSPORTATION SYSTEM INCLUDING A HOVERING VEHICLE

RELATED APPLICATIONS

This application claims priority under 35 U.S.C. §119 to U.S. Provisional Patent Application No. 61/475,845, filed Apr. 15, 2011, entitled "TRANSPORTATION SYSTEM INCLUDING A HOVERING VEHICLE," the entire content of which is incorporated herein by reference.

TECHNICAL FIELD

The present disclosure relates to a transportation system including a hovering vehicle.

BACKGROUND

Train systems are suitable for efficiently transporting many passengers and large amounts of material over long distances. Conventional train systems depend upon significant infrastructure including, for example, track systems and electrical distribution systems. For example, existing passenger and freight rail systems, high speed rail systems, and magnetic levitation trains require infrastructure such as rail lines, rail bridges, power systems for tracks, and rail control systems.

Costs of such infrastructure are typically very high. Additionally, much of the world's terrain is inappropriate for conventional rail systems. For example, terrain having a mix of water, ice, and land may be unsuitable for tracked rail.

Other transportation systems do not adequately address the limitations of conventional rail systems. For example, alternatives such as highways and air travel are not as efficient as rail in transporting large amounts of material and passengers, and also require significant infrastructure such as roads, bridges, and airports. Additionally, conventional transportation systems may also be unsuitable for terrain having a mix of water, ice, and land.

The present disclosure is directed to overcoming shortcomings and/or other deficiencies in existing technology, such as those discussed above.

SUMMARY OF THE DISCLOSURE

In accordance with one aspect, the present disclosure is directed toward a transportation system. The transportation system includes a self-powered vehicle configured to generate an air cushion on a trackless lane having a substantially flat surface. The vehicle is also configured to move over the substantially flat surface on the air cushion. The transportation system also includes a guidance system configured to guide the vehicle between peripheries of the trackless lane.

According to another aspect, the present disclosure is directed toward a method for operating a vehicle. The method includes self-powering the vehicle with at least one of carbonized fossil fuel, solar energy, and thermal energy. The method also includes generating an air cushion between a bottom of the vehicle and a substantially flat surface of a trackless lane. The method further includes moving the vehicle over the substantially flat surface on the air cushion, and communicating with a guidance system to guide the vehicle between peripheries of the trackless lane.

BRIEF DESCRIPTION OF THE DRAWINGS

FIG. 1 is a side view of an exemplary transportation system consistent with the disclosed embodiments;

FIG. 2 is a plan view of the transportation system of FIG. 1;

FIG. 3 is a detailed plan view of the transportation system of FIG. 1;

FIG. 4 is a detailed side view of the transportation system of FIG. 1;

DETAILED DESCRIPTION

Figure 5:
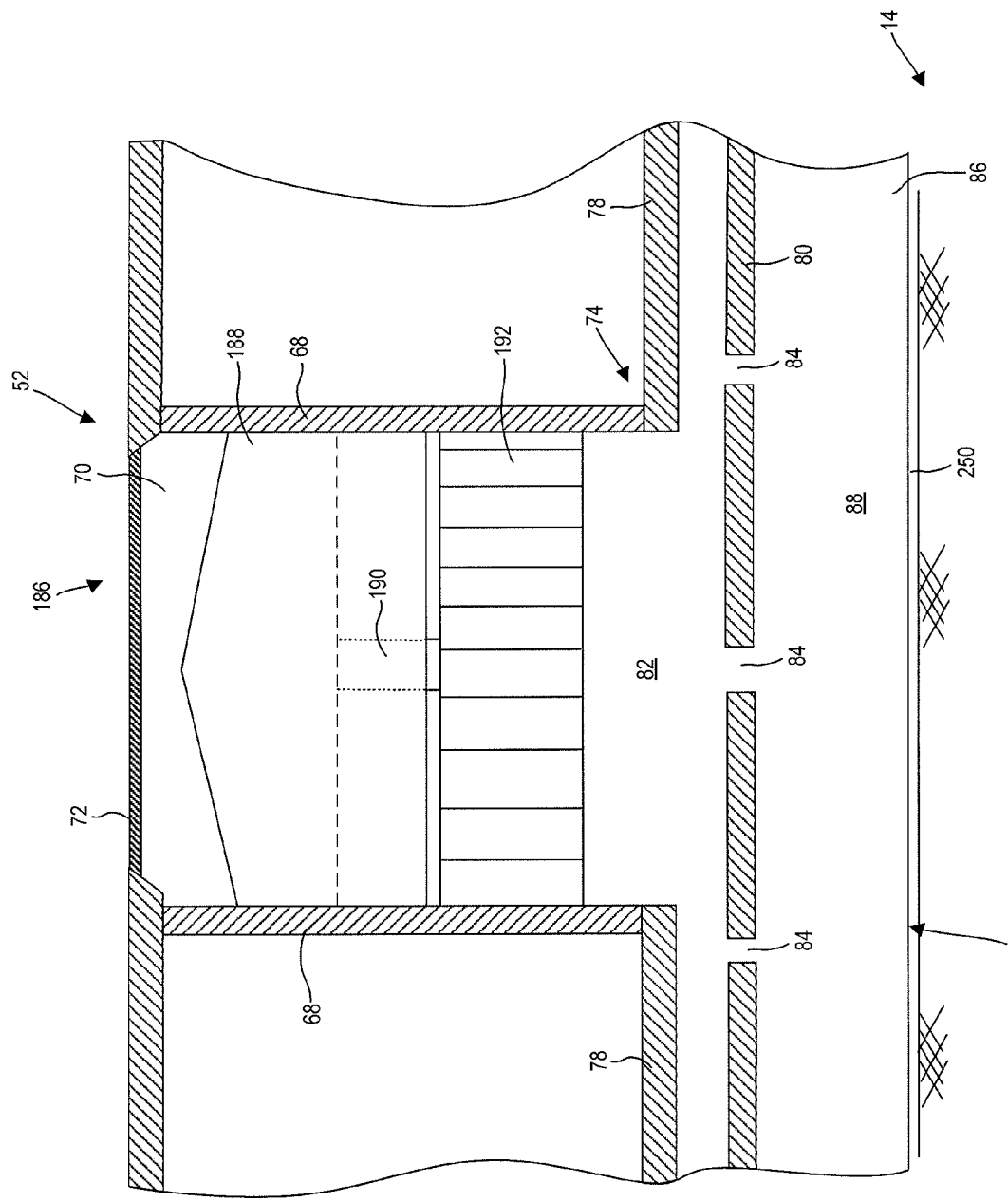
FIG. 5 is a cross-sectional view of an exemplary disclosed vertical thrust system of the transportation system of FIG. 1.

FIGS. 1 and 2 illustrate an exemplary transportation system comprising a hovering vehicle system 10 for transporting contents such as, for example, material and/or passengers. Hovering vehicle system 10 may include a vehicle 12 supported by a support system 14.

As depicted in FIGS. 1 and 2, vehicle 12 may include a structural system 16, a horizontal thrust system 18, a vertical thrust system 20, an energy system 22, a dispensing system 26 (depicted in more detail in FIG. 6), and a control system 27. Structural system 16 may support and/or house the various systems of vehicle 12. Horizontal thrust system 18 may provide for horizontal movement of vehicle 12, and vertical thrust system 20 may provide for vertical movement of vehicle 12. Energy system 22 may power the various systems of vehicle 12. Dispensing system 26 may dispense material to improve support system 14. Support system 14 may include the ground and/or other terrain over which vehicle 12 travels. Control system 27 may control the various systems of vehicle 12 and may communicate with support system 14.

As depicted in FIGS. 1 and 2, structural system 16 may include a leading module 28, one or more intermediate modules 30, and an end module 32. Leading module 28 may lead intermediate modules 30 in a direction of travel 34 of vehicle 12. Modules 30 may in turn lead end module 32 in direction of travel 34. Structural system 16 may also include a single module or any number of modules structurally supporting the various systems of vehicle 12 described herein. For example, vehicle 12 may be a single module vehicle or may be in a train configuration of multiple modules. For example, vehicle 12 may be a multi-car train including a plurality of cars.

As depicted in FIGS. 3 and 4, leading module 28 may include a housing 36 and a hood assembly 38. Housing 36 may be supported above hood assembly 38, and both housing 36 and hood assembly 38 may structurally support the various systems of leading module 28.

Housing 36 may include any suitable relatively lightweight material for structurally supporting the various systems of leading module 28 such as, for example, materials having a relatively low density and/or a relatively high strength-to-weight ratio. For example, in some embodiments, housing 36 may include relatively light materials such as, for example, aluminum, titanium, plastics/polymers, carbon fiber, carbon fiber-reinforced polymer or carbon fiber-reinforced plastic, or any suitable combinations thereof. Use of lightweight materials may reduce the weight of leading module 28, thereby reducing the amount of energy required to suspend and move leading module 28.

As depicted in FIGS. 3 and 4, housing 36 may be formed into an aerodynamics and stability configuration, including a front window assembly 42, one or more side window assemblies 44, and one or more door assemblies 46 for accessing a compartment 48. Housing 36 may also include a horizontal thrust assembly 50 for housing elements of horizontal thrust system 18 and a vertical thrust assembly 52 for housing elements of vertical thrust system 20.

The aerodynamics and stability configuration may include a width dimension 54, a length dimension 56, and a height dimension 58. One of width dimension 54 and length dimension 56 may be significantly larger than height dimension 58, so that leading module 28 may have a relatively flat design. For example, width dimension 54 and/or length dimension 56 may be between about two and about six times greater than height dimension 58. Leading module 28 may thereby have a relatively flat shape, which may improve stability of leading module 28 as it moves over support system 14. It is also contemplated that dimensions 54, 56, and 58 may be substantially equal, or have any suitable ratio with respect to each other. The aerodynamics and stability configuration may also include slanted surfaces such as, for example, slanted surfaces 60 and 62. Slanted surfaces 60 and 62 may slope upward from the front to the rear of leading module 28, relative to direction of travel 34, as depicted, for example, in FIG. 4. Slanted surfaces 60 and 62 may thereby make leading module 28 more aerodynamic in a direction of travel 34, because air may tend to be urged over a top of leading module 28, via slanted surfaces 60 and 62, as leading module 28 moves in direction of travel 34. Intermediate modules 30 and end module 32 of vehicle 12 may include designs similar to the aerodynamics and stability configuration of leading module 28.

Front window assembly 42 and the one or more side window assemblies 44 may include apertures provided in housing 36 that are configured to receive transparent structural material. The apertures of window assemblies 42 and 44 may communicate with compartment 48 so that operating personnel located in compartment 48 may view the environment surrounding vehicle 12. Operating personnel may access compartment 48 via one or more door assemblies 46. Compartment 48 may house input and/or output terminals of control system 27, so that operating personnel located in compartment 48 may control the various systems of vehicle 12.

As depicted in FIG. 3, horizontal thrust assembly 50 may include one or more recesses 64 and a cavity 66 for housing elements of horizontal thrust system 18. Recesses 64 may be defined by any suitable shape formed in housing 36 for structural support of horizontal thrust assembly 50. Cavity 66 may be formed within housing 36 and may be configured to contain mechanical elements of horizontal thrust system 18.

As depicted in FIG. 5, vertical thrust assembly 52 may include one or more walls 68 forming a cavity 70. Cavity 70 may house elements of vertical thrust system 20. Vertical thrust assembly 52 may also include a vent 72 which may protect elements of vertical thrust system 20 while allowing ambient air from the environment surrounding leading module 28 to communicate with cavity 70.

Figure 6:
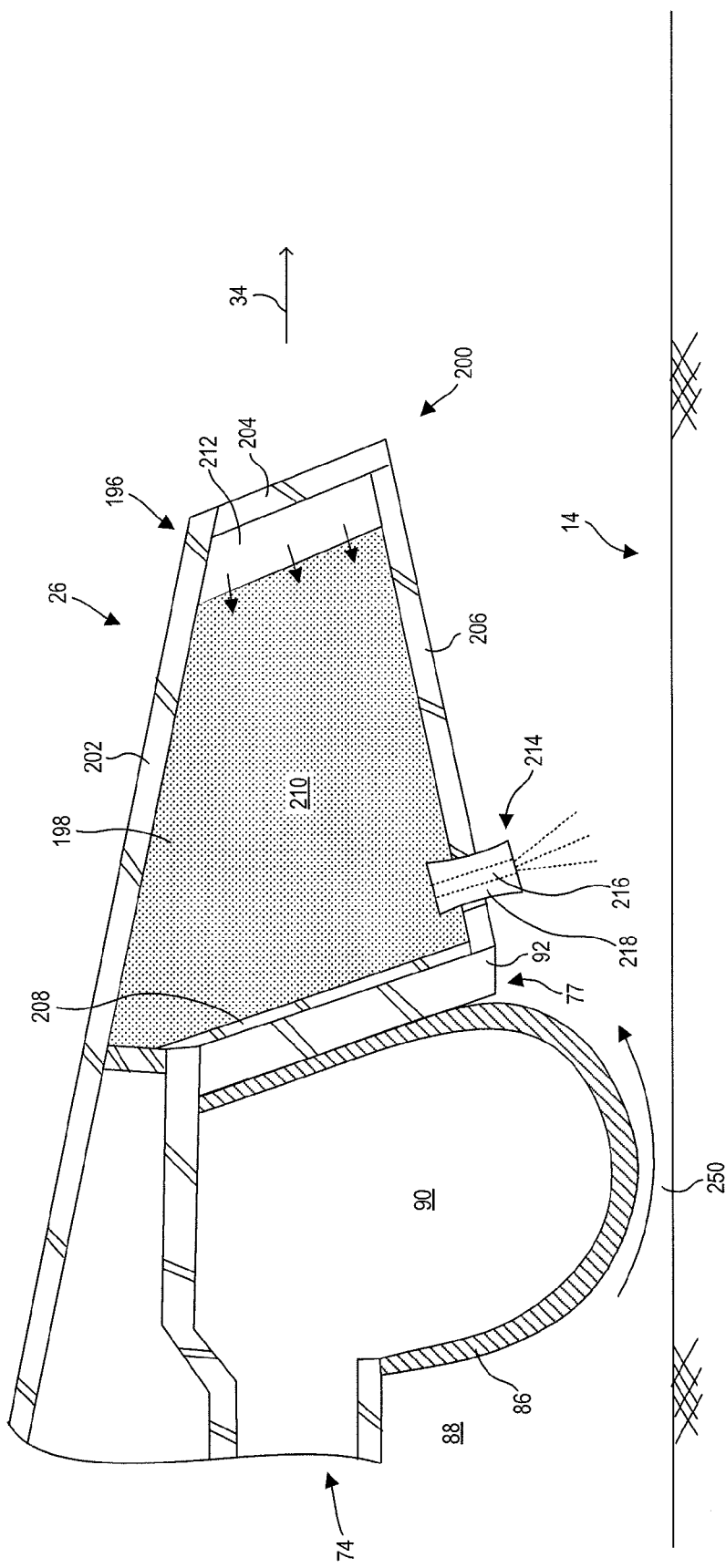
FIG. 6 is a cross-sectional view of an exemplary dispensing system of the transportation system of FIG. 1.

As depicted in FIGS. 4 and 5, hood assembly 38 may include a plenum 74, a hood 76, and a strut system 77 (depicted in FIG. 6). Plenum 74 may provide pressurized air to fill hood 76, and strut system 77 may support hood assembly 38.

As depicted in FIG. 5, plenum 74 may include one or more upper walls 78 and one or more lower walls 80. Upper walls 78 may be attached to walls 68 of vertical thrust assembly 52 so that a cavity 82, suitable for containing pressurized air, is defined by walls 68, 78, and 80. Lower walls 80 may include one or more apertures 84 that allow cavity 82 to communicate with hood 76.

As depicted in FIGS. 5 and 6, hood 76 may include an inflatable bead 86, which, in conjunction with lower wall 80 of plenum 74 and a surface of support system 14, may define a space 88. Bead 86 may be configured to receive, into space 88, pressurized air that may be stored in plenum 74. For example, cavity 82 of plenum 74 may be in fluid communication with a bead interior 90 of bead 86, such that pressurized air from plenum 74 may inflate bead 86 by entering space 88 via apertures 84.

As depicted in FIG. 6, strut system 77 may include a plurality of struts 92 disposed adjacent to bead 86. Struts 92 may extend below a bottom surface of lower walls 80 of plenum 74, thereby allowing struts 92 to structurally support hood assembly 38 of leading module 28 on a surface of support system 14 when bead 86 is not inflated. Strut system 77 may be included on leading module 28, intermediate modules 30, and/or end module 32.

Referring again to FIGS. 3 and 4, each intermediate module 30 of structural system 16 may have a housing 94 and a hood assembly 96 that are similar to housing 36 and hood assembly 38 of leading module 28.

In some embodiments, housing 94 may have one or more side window assemblies 98, one or more door assemblies 100 for accessing a compartment 102, and a vertical thrust assembly 104 for housing elements of vertical thrust system 20. Side window assemblies 98, door assemblies 100, and vertical thrust assembly 104 may be similar to side window assemblies 44, door assemblies 46, and vertical thrust assembly 52, respectively, of housing 36 of leading module 28.

As depicted in FIG. 4, compartment 102 may be disposed within intermediate module 30 and may house any contents suitable for transportation. For example, compartment 102 may contain contents such as retail goods, raw materials, and/or passenger chairs and seats. In some embodiments, compartment 102 may be configured to contain pressurized or unpressurized liquids and/or food. Further, compartment 102 may also include multiple levels of storage, e.g., providing for passengers on an upper level and material storage on a lower level. Contents to be transported may be loaded into compartment 102 via door assembly 100. Vertical thrust assembly 104 may be disposed within a central portion of compartment 102, and material may be disposed to the front, rear, and sides of vertical thrust assembly 104, relative to direction of travel 34.

As depicted in FIGS. 4 and 6, hood assembly 96 of intermediate module 30 may include a plenum 106, a hood 108, and a strut system 110 that may be similar to plenum 74, hood 76, and strut system 77 of leading module 28. Referring again to FIGS. 1 and 2, end module 32 of structural system 16 may be similar to leading module 28 and intermediate module 30. For example, end module 32 may include a housing 112 and a hood assembly 114 that are similar to housing 36 and hood assembly 38 of leading module 28. Also, housing 112 may include a horizontal thrust assembly 116 that is similar to horizontal thrust assembly 50 of leading module 28. Further, housing 112 may include a vertical thrust assembly 118 that is similar to vertical thrust assembly 104 of intermediate module 30. Also, housing 112 may include a compartment 120 that is similar to compartment 102 of intermediate module 30.

Horizontal thrust system 18 of vehicle 12 may include a forward thrust subsystem 122, a reverse thrust subsystem 124, and a maneuver subsystem 126. Forward thrust subsystem 122 may urge vehicle 12 in a direction of travel 34, reverse thrust subsystem 124 may urge vehicle 12 in a direction substantially opposite to direction of travel 34, and maneuver subsystem 126 may provide for the maneuvering of vehicle 12.

Figure 7:
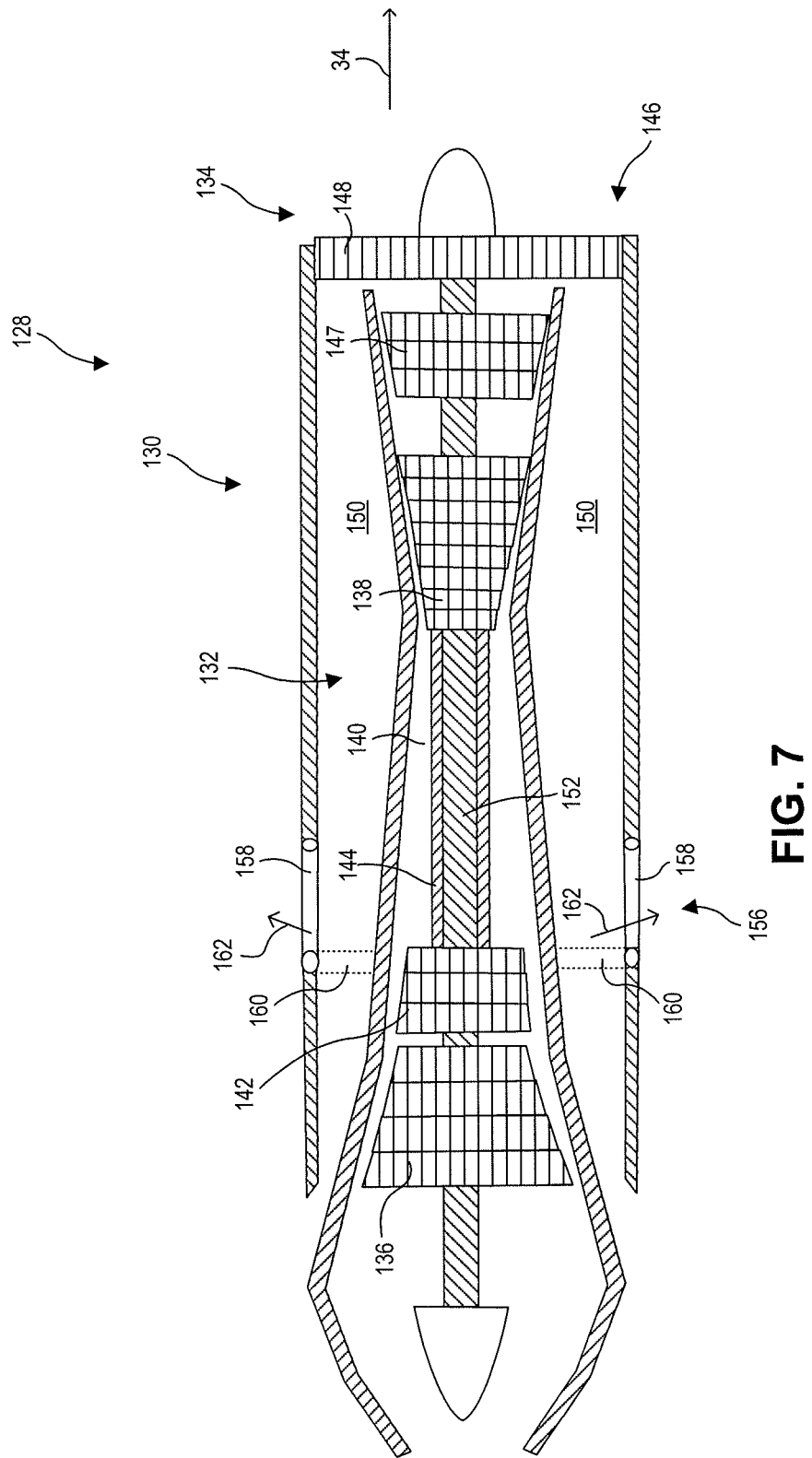
FIG. 7 is a cross-sectional view of an exemplary horizontal thrust system of the transportation system of FIG. 1.

Forward thrust subsystem 122 may include one or more power sources 128, depicted in FIG. 7. Power source 128 may be disposed in recess 64 of horizontal thrust assembly 50 of leading module 28, and supporting components of power source 128 may be disposed in cavity 66 of leading module 28. It is also contemplated that power source 128 may be located on intermediate module 30 and/or end module 32.

Power source 128 may be any suitable device for producing a thrust to urge vehicle 12 in a direction of travel 34 such as, for example, an internal combustion engine, a battery, a fuel cell, or a motor. For example, as depicted in FIG. 7, power source 128 may include a gas turbine engine such as a turbofan engine 130. Turbofan engine 130 may include a core engine 132, a fan system 134, and an additional turbine 136. Core engine 132 may be surrounded by fan system 134 at a front portion of turbofan engine 130, and may be surrounded by additional turbine 136 at a rear portion of turbofan engine 130, with respect to direction of travel 34.

As depicted in FIG. 7, core engine 132 may include a core compressor 138, a core combustion area 140, a core turbine 142, and a rotatable core shaft 144. Core compressor 138 may pressurize air, and fuel may be burned in core combustion area 140 to produce gas with high pressure and velocity. Core turbine 142 may extract energy from the gas having high pressure and velocity. Core engine 132 may thereby produce thrust that urges vehicle 12 in direction of travel 34.

Fan system 134 may include an air inlet 146, a compressor 147, a fan 148, and a bypass 150. Air inlet 146 may capture ambient air, a portion of which is directed to core compressor 138 and into core engine 132, and a portion of which is directed to bypass 150. The air passing through bypass 150 may have a relatively higher velocity, and may add to the thrust produced by turbofan engine 130. Additional turbine 136 may be attached to turbofan engine 130 by a shaft 152 and may also add to the thrust produced by turbofan engine 130.

As depicted in FIGS. 1 and 2, reverse thrust subsystem 124 may include one or more power sources 154 and one or more thrust reversers 156. Power source 154 may be similar to power source 128 of forward thrust subsystem 122, except that the orientation of power source 154 may be substantially opposite to that of power source 128. Therefore, power source 154 may urge vehicle 12 in a direction that is substantially opposite to direction of travel 34. Power source 154 may be disposed within horizontal thrust assembly 116 of end module 32, similar to the arrangement of power source 128 within horizontal thrust assembly 50 of leading module 28, with the exception that the orientation of power source 154 may be reversed. It is also contemplated that power source 154 may be located on leading module 28 and/or one or more intermediate modules 30.

As depicted in FIG. 7, one or more thrust reversers 156 of reverse thrust subsystem 124 may be disposed on power source 128 of forward thrust subsystem 122. Thrust reversers 156 of reverse thrust subsystem 124 may reduce the amount of thrust produced by power source 128 of forward thrust subsystem 122, thereby reducing the amount of thrust urging vehicle 12 in direction of travel 34. Thrust reversers 156 may include thrust levers 158, depicted in FIG. 7 in a closed position. Thrust reversers may be moved to an open position 160 (depicted in FIG. 7 as a dashed line), which may close bypass 150 to airflow and eject bypassing air out of bypass 150 in a direction 162, which may produce thrust partially opposing the remaining thrust produced by power source 128. Thrust reversers 156 may thereby reduce the net thrust generated by power source 128 in direction of travel 34 when thrust levers 158 are in an open position.

As depicted in FIGS. 1-3, maneuver subsystem 126 of horizontal thrust system 18 may include a plurality of linkage assemblies 127 and a plurality of rudders 129. Linkage assemblies 127 may connect modules 28, 30, and/or 32, and rudders 129 may be configured to steer vehicle 12.

As depicted in FIGS. 1 and 2, rudders 129 may be located on a top surface of modules 28, 30, and 32. Rudders 129 may be formed from a material similar to housings 36, 94, and 112 of modules 28, 30, and 32. Rudders 129 may include actuating elements such as, for example, batteries and motors, to rotate rudders 129 about a substantially vertical axis. Rudders 129 may be controlled by operators of vehicle 12 via control system 27. Each rudder 129 may be controlled independently from other rudders 129. In some embodiments, some or all of rudders 129 may be controlled to perform the same movement in unison.

Figure 8:
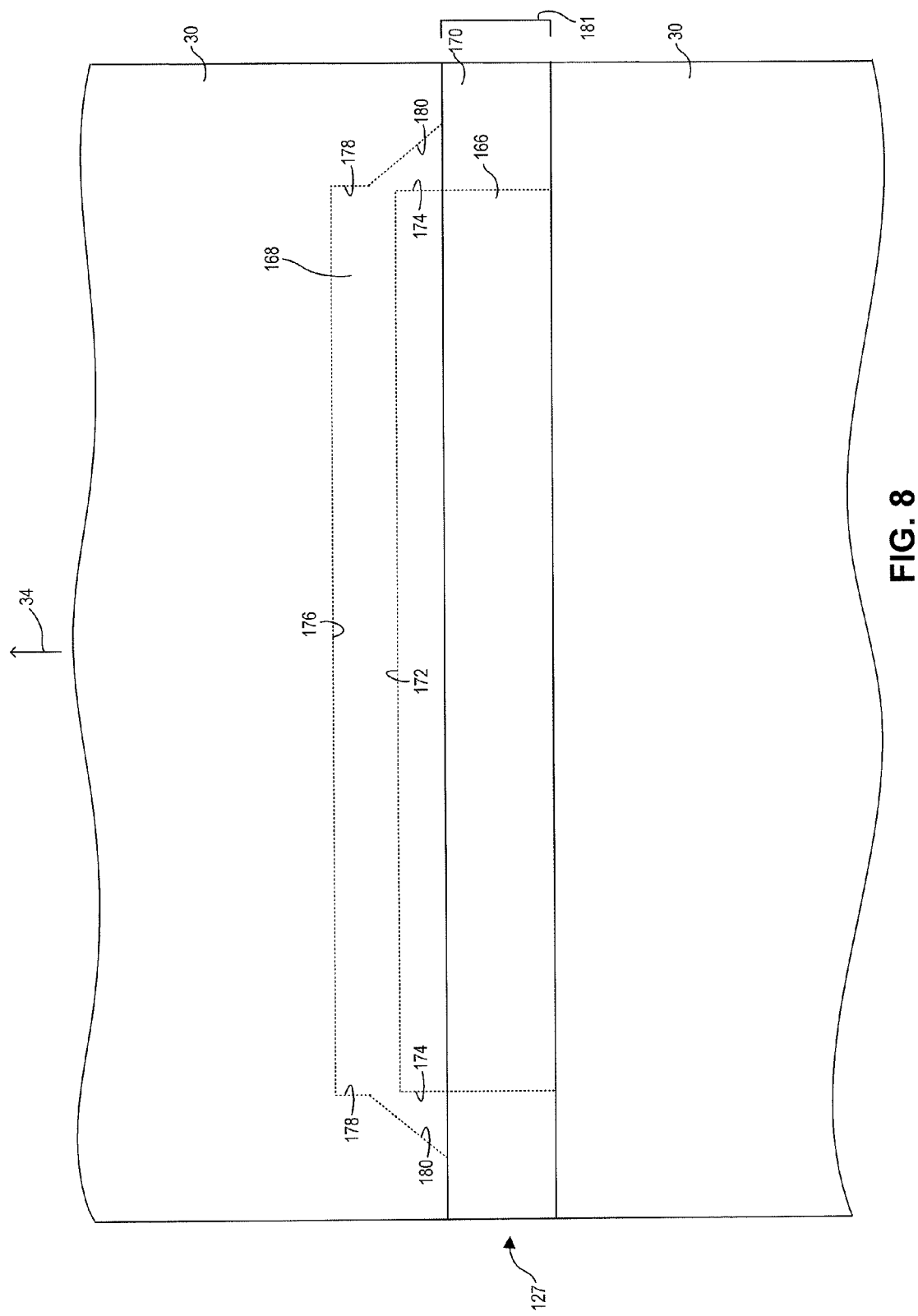
FIG. 8 is a schematic view of an exemplary linkage subsystem of the transportation system of FIG. 1.
Figure 9:
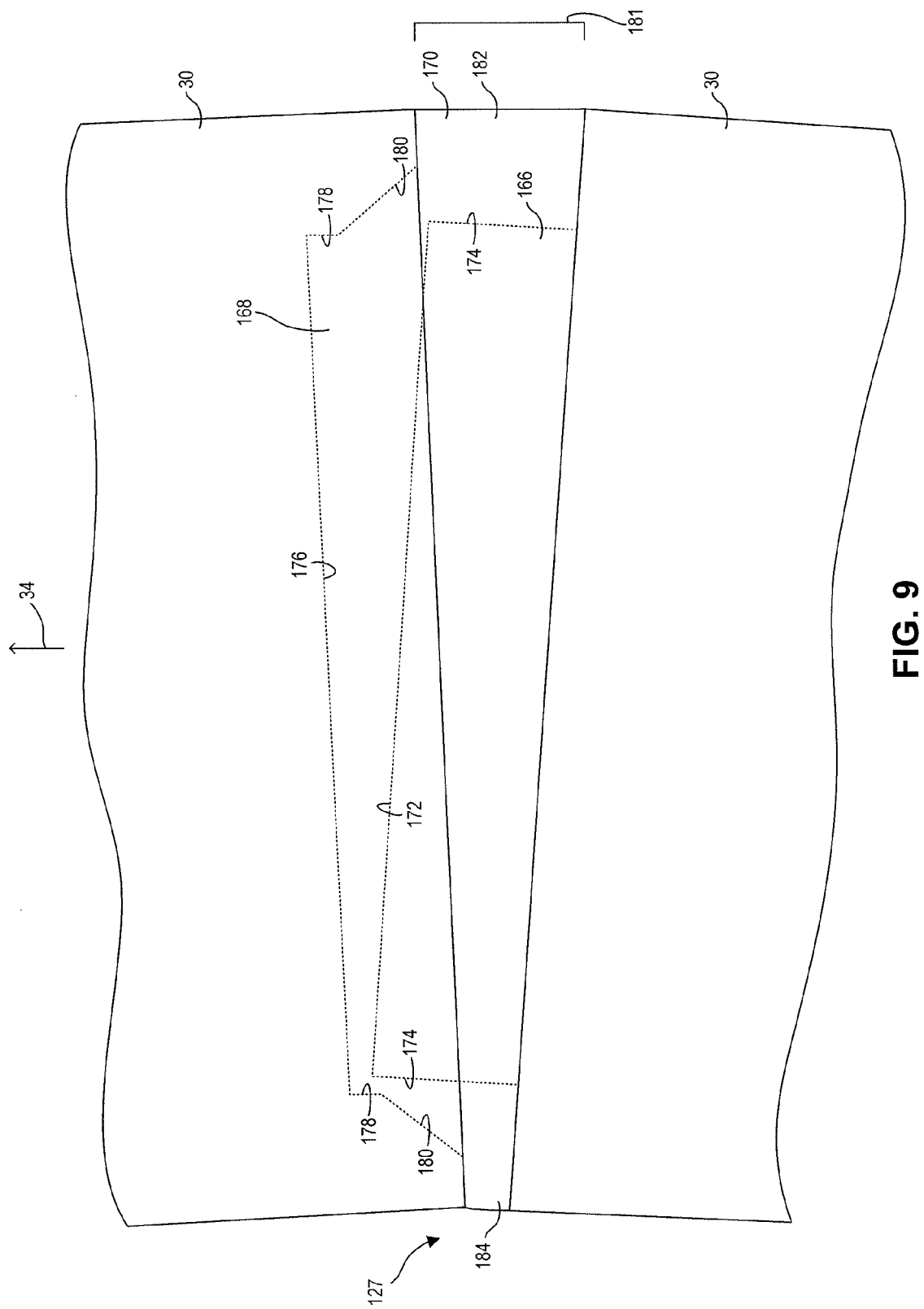
FIG. 9 is another schematic view of the linkage subsystem of FIG. 8.
Figure 10:
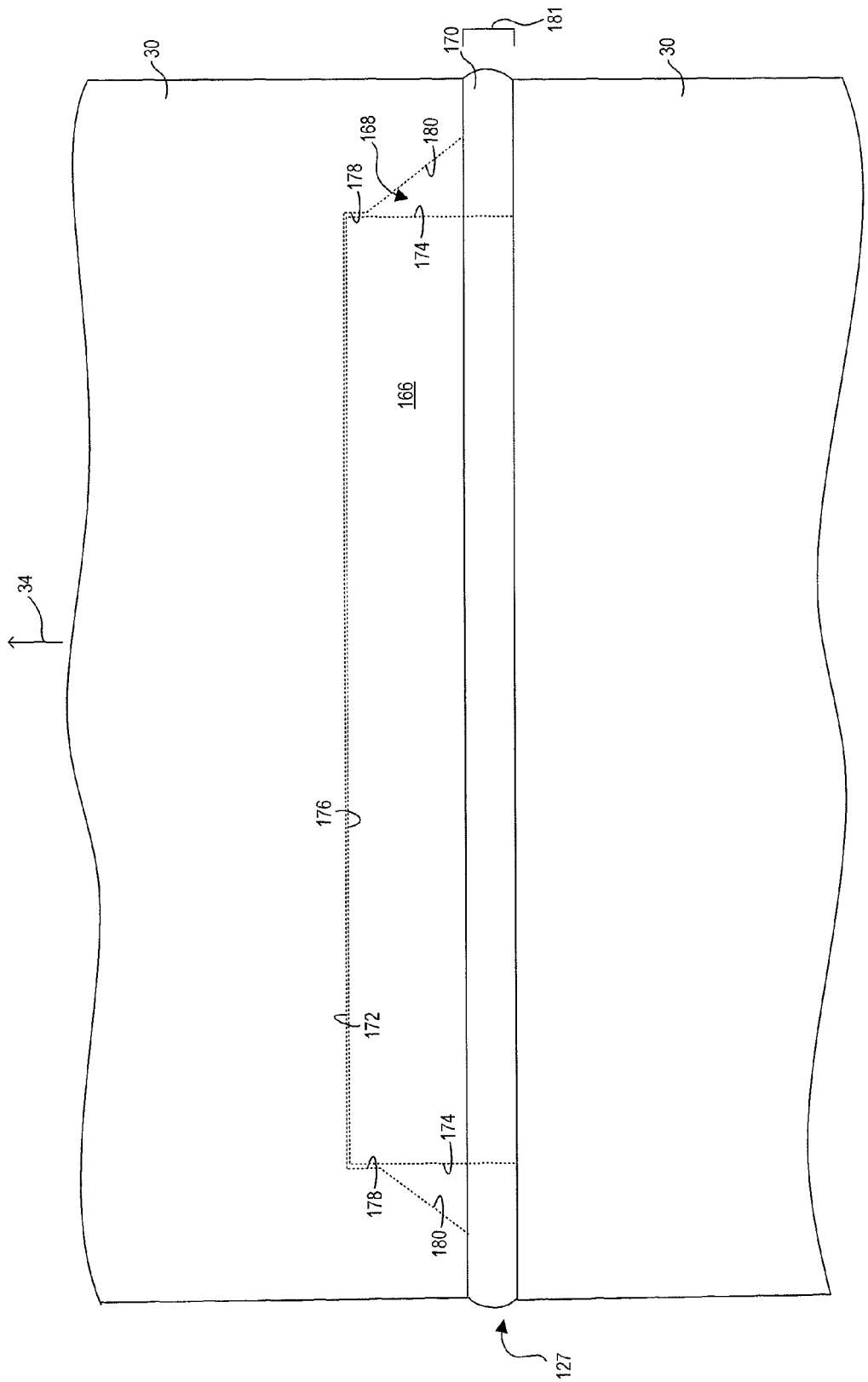
FIG. 10 is another schematic view of linkage subsystem of FIG. 8.

In some embodiments, as depicted in FIG. 1, linkage assemblies 127 may be disposed at locations 164, between the modules of structural system 16. As depicted in FIGS. 8, 9, and 10, linkage assemblies 127 may include one or more protrusions 166, one or more apertures 168, and one or more flexible bearings 170 at each location 164. Aperture 168 may be configured to receive protrusion 166, and flexible bearing 170 may be disposed around protrusion 166 and between modules 28, 30, and/or 32.

As depicted in FIGS. 8, 9, and 10, protrusion 166 may be any suitable structural element extending from a front portion and/or a rear portion of modules 28, 30, and 32. Protrusion 166 may extend over part or substantially all of a front and/or rear wall of modules 28, 30, and 32. Protrusion 166 may be any suitable shape such as, for example, a rectangular shape having surfaces 172 and 174.

Aperture 168 may be configured to receive protrusion 166, and may include surfaces 176 and 178. As depicted in FIG. 10, aperture 168 may receive protrusion 166 such that portions of surfaces 176 and 178 abut portions of surfaces 172 and 174, respectively. Aperture 168 may also include slanted surfaces 180 that may slant outward toward exterior surfaces of modules 28, 30, and/or 32.

Flexible bearing 170 may include any suitable material for providing a bearing connection between modules 28, 30, and/or 32 such as, for example, an elastomeric material, a rubber material, or any other suitable flexible material having significant capacity to expand and contract elastically. Flexible bearing 170 may thereby significantly expand and contract, and undergo large displacements relative to the overall dimensions of flexible bearing 170, without experiencing significant permanent inelastic deformation. As depicted in FIG. 8, flexible bearing 170 may be disposed between modules 28, 30, and/or 32, and may fill part or substantially all of a gap 181 between modules 28, 30, and 32.

As depicted in FIG. 9, flexible bearing 170 may expand and contract based on relative movement of modules 28, 30, and/ or 32 such as, for example, when vehicle 12 maneuvers horizontally, makes elevation changes, and/or makes turns while moving on support system 14. For example, when vehicle 12 turns, gap 181 may expand at a side portion 182 and contract at a side portion 184. Also, as vehicle 12 turns, slanted surfaces 180 of aperture 168 may provide enough clearance so that protrusion 166 is not obstructed by aperture 168. Because flexible bearing 170 may have significant capacity to expand, contract, and undergo large displacements elastically, flexible bearing 170 may continuously provide a bearing surface between modules 28, 30, and 32 as side portions 182 and 184 of gap 181 expand and/or contract. As depicted in FIG. 10, flexible bearing 170 may contract as gap 181 contracts, for example, when vehicle 12 brakes during an operation of reverse thrust subsystem 124.

Referring back to FIG. 2, vertical thrust system 20 of vehicle 12 may include a plurality of vertical thrust subsystems 186 that may be disposed in vertical thrust assembly 52 of leading module 28, vertical thrust assembly 104 of intermediate modules 30, and/or vertical thrust assembly 118 of end module 32. Vertical thrust system 20 may produce an air cushion to urge modules 28, 30, and/or 32 in a substantially vertical, upward direction so that vehicle 12 may hover above a surface of support system 14.

As depicted in FIG. 5, each vertical thrust subsystem 186 may include a power source 188, a shaft 190, and a fan 192. Power source 188 may be any suitable power source for driving shaft 190. Power source 188 may be, for example, a power source that is similar to core engine 132 of forward thrust subsystem 122. Shaft 190 may be any suitable structural element that may mechanically transfer power output from power source 188 to fan 192, thereby driving fan 192. Fan 192 may pressurize air disposed in cavity 82 of plenum 74 of modules 28, 30, and 32.

As depicted in FIG. 1, energy system 22 of vehicle 12 may provide energy to power the various systems of vehicle 12. Energy system 22 may include energy delivery subsystems such as fuel tanks, fuel lines, batteries, electrical converters, and electrical lines that may be disposed in any suitable location of vehicle 12 such as, for example, cavity 66 and assemblies 50 and 52 of leading module 28, vertical thrust assembly 104 of intermediate modules 30, and/or horizontal thrust assembly 116 and vertical thrust assembly 118 of end module 32. Elements of energy system 22 may also be located in any suitable locations within housing 36 of leading module 28, housing 94 of intermediate modules 30, and housing 112 of end module 32. For example, energy system 22 may include any suitable type of liquid, solid, or gaseous fuel stored within containers housed in housings 36, 94, and/or 112 of vehicle 12, and configured to provide thrust systems 18 and/or 20 with fuel. For example, any suitable liquid fuel such as, for example, gas, gaseous fuel, and/or carbonized or carburized fossil fuels may be provided by energy system 22 to thrust systems 18 and/or 20. Thus, vehicle 12 may be self-powered by utilizing energy system 22.

Energy system 22 may also transfer power produced by thrust systems 18 and/or 20 to structural system 16 (e.g., for lighting, water supply systems, heating, and cooling), dispensing system 26, and control system 27 via any suitable power transfer elements such as, for example, electrical lines. Referring back to FIGS. 1 and 2, energy system 22 may include energy collectors 194 disposed on exterior surfaces of modules 28, 30, and/or 32. Energy collectors 194 may include, for example, any suitable device for converting solar energy to electrical energy such as, for example, photovoltaic cells. Energy collectors 194 may also include thermal energy devices for producing power from ambient thermal effects such as, for example, a thermal gradient. Energy collectors 194 may be provided in a substantially flat form having a low profile, so as not to inhibit the effectiveness of the aerodynamics and stability configuration of modules 28, 30, and 32. For example, flexible energy collectors 194 may be adhered to the exterior surface contours of vehicle 12. Energy collected by energy collectors 194 may be used to partially or substantially entirely power some or all of the various systems of vehicle 12.

Energy system 22 may provide for an independent self-powering of each of modules 28, 30, and 32. For example, power sources of thrust systems 18 and/or 20 and energy collectors 194 may be used to power the respective module in which each power source and energy collector 194 is disposed via energy system 22. Additionally, energy system 22 may provide for an integrated self-powering of the entire vehicle 12. For example, power from each of the thrust systems 18 and/or 20 and energy collectors 194 may be transferred between modules 28, 30, and/or 32 via energy system 22, and may be used to power the various systems on some or all of the modules of vehicle 12.

As depicted in FIG. 6, dispensing system 26 of vehicle 12 may include a housing 196, a surface-improving fill 198, and a dispenser 200. Housing 196 may contain fill 198, which may be dispensed by dispenser 200 onto a surface of support system 14. Fill 198 may include any suitable surface-improving material for improving a surface of support system 14. For example, fill 198 may include lime, cement, lime-fly ash, fly ash, smooth aggregate, coarse aggregate, and/or water.

As depicted in FIG. 6, housing 196 may be formed from any structural material suitable for containing pressurized or unpressurized contents. Housing 196 may include a plurality of structural elements 202, 204, 206, and 208, which may be attached to modules 28, 30, and/or 32 and may define a cavity 210. Fill 198 may be disposed in cavity 210.

Dispensing system 26 may be located at any suitable location of vehicle 12 such as, for example, on or within hood assemblies 38, 96, and/or 114 of vehicle 12. For example, dispensing system 26 may be located on hood assembly 38 at a front portion of leading module 28, relative to direction of travel 34. Dispenser 200 may include any suitable devices for dispensing fill 198 from cavity 210 of housing 196. For example, dispenser 200 may include a pressurizing device 212 that pressurizes fill 198 such as, for example, a jacking device. Dispenser 200 may also include a delivery device 214 that may include an orifice 216 and a sprayer 218. Fill 198 may be urged under pressure through orifice 216 and/or driven by sprayer 218 through orifice 216, thereby dispensing fill 198 from cavity 210.

Control system 27 of vehicle 12 may control the various systems of vehicle 12. Control system 27 may be located in any suitable location or locations of vehicle 12. For example, control system 27 may be disposed within housing 36 of leading module 28, housing 94 of intermediate modules 30, and/or housing 112 of end module 32. In some embodiments, control system 27 may be integrated with energy system 22 of vehicle 12. Input and/or output terminals of control system 27 may be located within compartment 48 of leading module 28, compartment 102 of intermediate modules 30, and/or compartment 120 of end module 32 such that operating personnel and/or passengers may access control system 27. For example, operating personnel located in compartment 48 of leading module 28 may use the input and output terminals to control the operation of lighting, water supply systems, heating, and cooling systems of structural system 16, the various elements of horizontal thrust system 18, vertical thrust system 20, energy system 22, and/or dispensing system 26. Control system 27 may also include devices configured to communicate with support system 14 such as, for example, transponders, receivers, transmitters, and/or interrogation devices. Control system 27 may include one or more subsystems for controlling one or more, or all, of modules 28, 30, and 32. Control system 27 may shift between one or more modes of operation for controlling vehicle 12.

Figure 11:
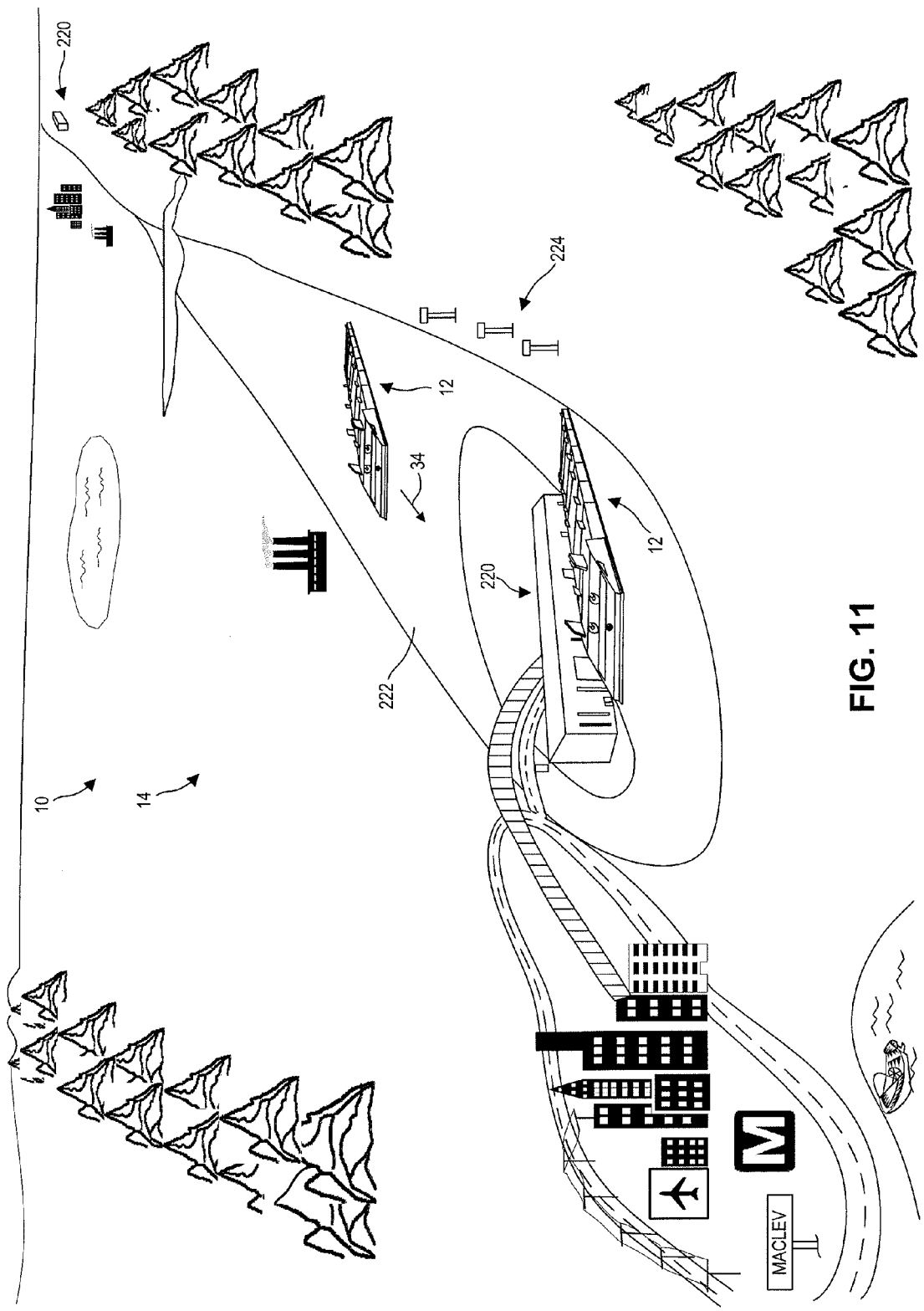
FIG. 11 is a perspective view of the transportation system of FIG. 1.

Turning now to support system 14 that supports vehicle 12, as depicted in FIG. 11, support system 14 may include one or more stations 220, at least one trackless lane 222, and a guidance system 224. Station 220 may be located adjacent to lane 222. Vehicle 12 may travel on lane 222, and may be guided by guidance system 224. Support system 14 may be a trackless support system for supporting vehicle 12.

Figure 12:
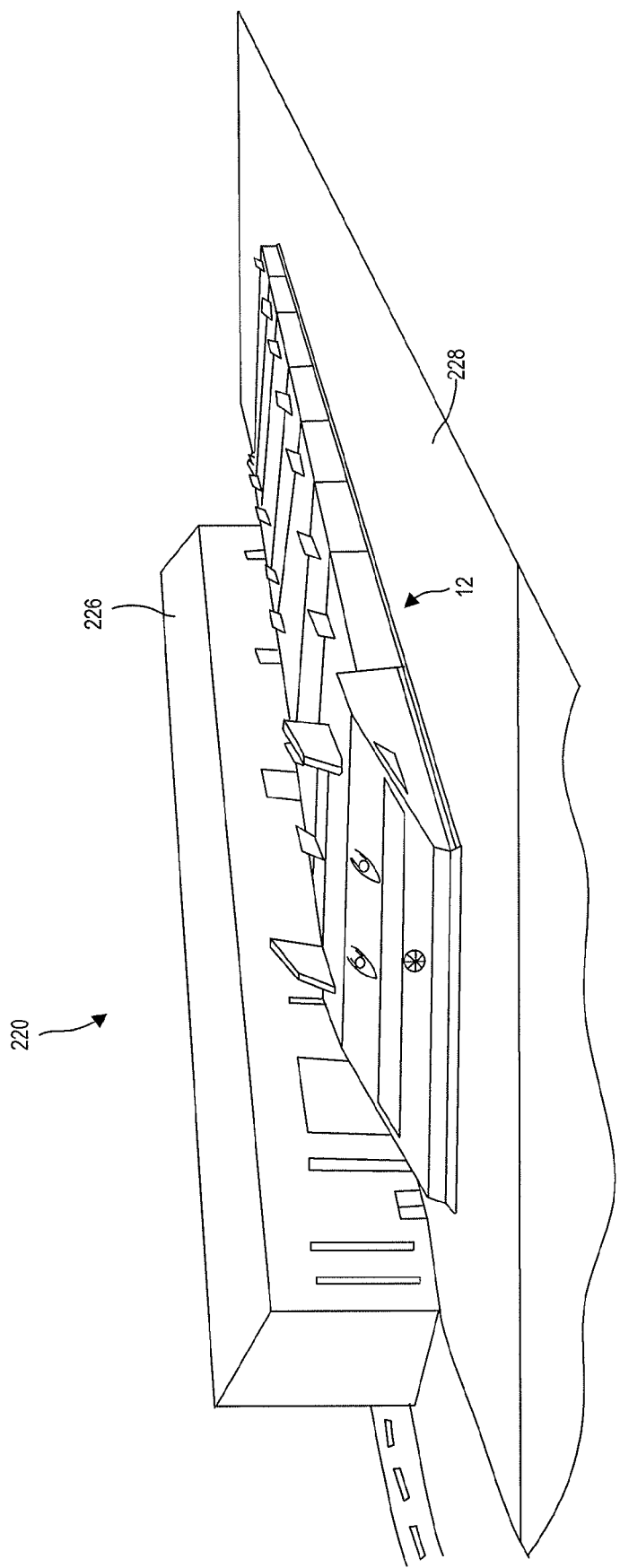
FIG. 12 is a perspective view of the transportation system of FIG. 1

As depicted in FIG. 12, station 220 of support system 14 may include a facility 226 and a pad 228. Pad 228 may be located adjacent to facility 226, and may support vehicle 12 when vehicle 12 utilizes station 220. Station 220 may include access to conventional transportation such as, for example, conventional rail systems and highway systems.

Facility 226 may include one or more structures for housing support personnel, maintenance equipment, passengers, material for transport, transportation services, and any other items used in conjunction with transporting people and material. Facility 226 may be located adjacent to one or more lanes 222 and pads 228, such that materials and personnel may be moved between vehicle 12 and facility 226.

As depicted in FIG. 12, pad 228 may support vehicle 12 when vehicle 12 utilizes station 220. Pad 228 may be formed from any material suitable for providing bearing support to vehicle 12 when it is in a non-hovering state. Pad 228 may be formed of stiff and/or flexible material. For example, pad 228 may include stiff materials, such as concrete, asphalt, rubberized asphalt and/or flexible materials, such as elastomeric material and/or rubber. Alternatively, or additionally, in some embodiments, pad 228 may include earth, earth including additives (e.g., lime, cement, lime-fly ash, fly ash, smooth aggregate, coarse aggregate, and/or water), grass, and/or turf. Pad 228 may support vehicle 12 in a hovering state and/or in a non-hovering state. For example, strut systems 77 and 110 of vehicle 12 may be supported on pad 228 when vehicle 12 is in a non-hovering state and bead 86 is not inflated. Pad 228 may be sized to receive some or all of the modules of vehicle 12.

Figure 13:
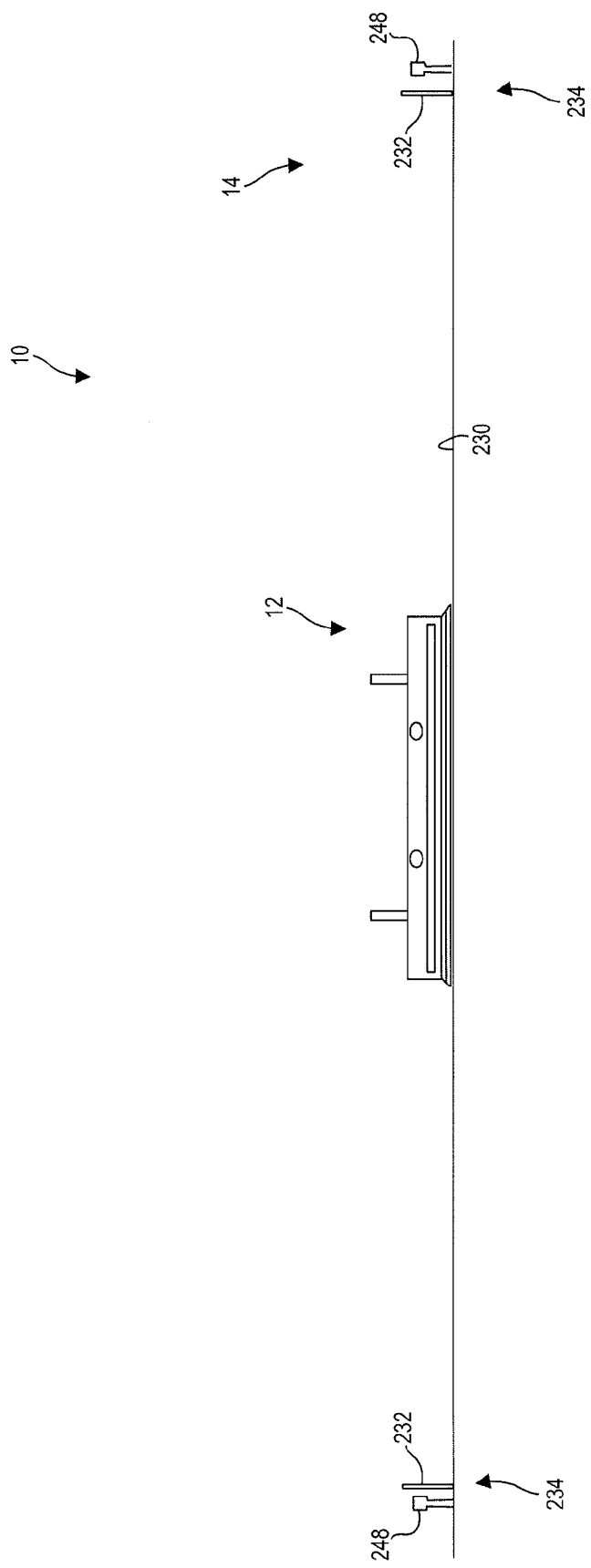
FIG. 13 is a front view of the transportation system of FIG. 1.

As depicted in FIG. 13, lane 222 of support system 14 may include a substantially flat surface 230 and one or more barriers 232 located at peripheries 234 of substantially flat surface 230. Barriers 232 located at or near peripheries 234 of lane 222 may include any suitable barrier systems such as, for example, metal fencing, wood fencing, plastic fencing, concrete barriers, plastic barriers including a fill (e.g., sand or water), and earthen berms. It is contemplated that barriers 232 may be located at or near a center and/or interior location of lane 222. It is also contemplated that peripheries 234 of lane 222 may be open and include no barriers.

Lane 222 may be trackless. "Trackless" means supporting vehicle 12 without any type of structural element protruding from substantially flat surface 230 to structurally support vehicle 12 such as, for example, conventional railroad rail, reaction rail for tracked hovercraft, magnetic levitation linear rail, rail for supporting a tracked linear induction motor vehicle, monorail track, or any other structural element that protrudes from a surface over which the vehicle travels and mechanically engages or provides a reaction surface for the vehicle.

Figure 14:
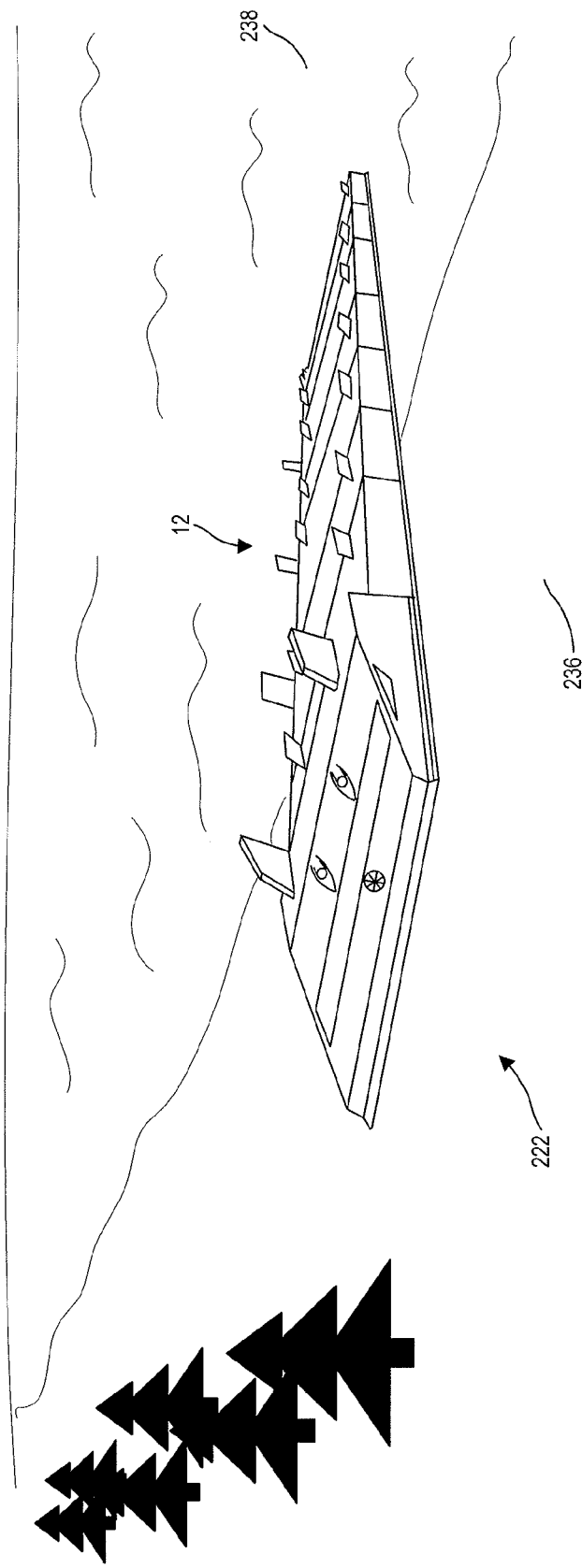
FIG. 14 is a perspective view of the transportation system of FIG. 1.
Figure 15:
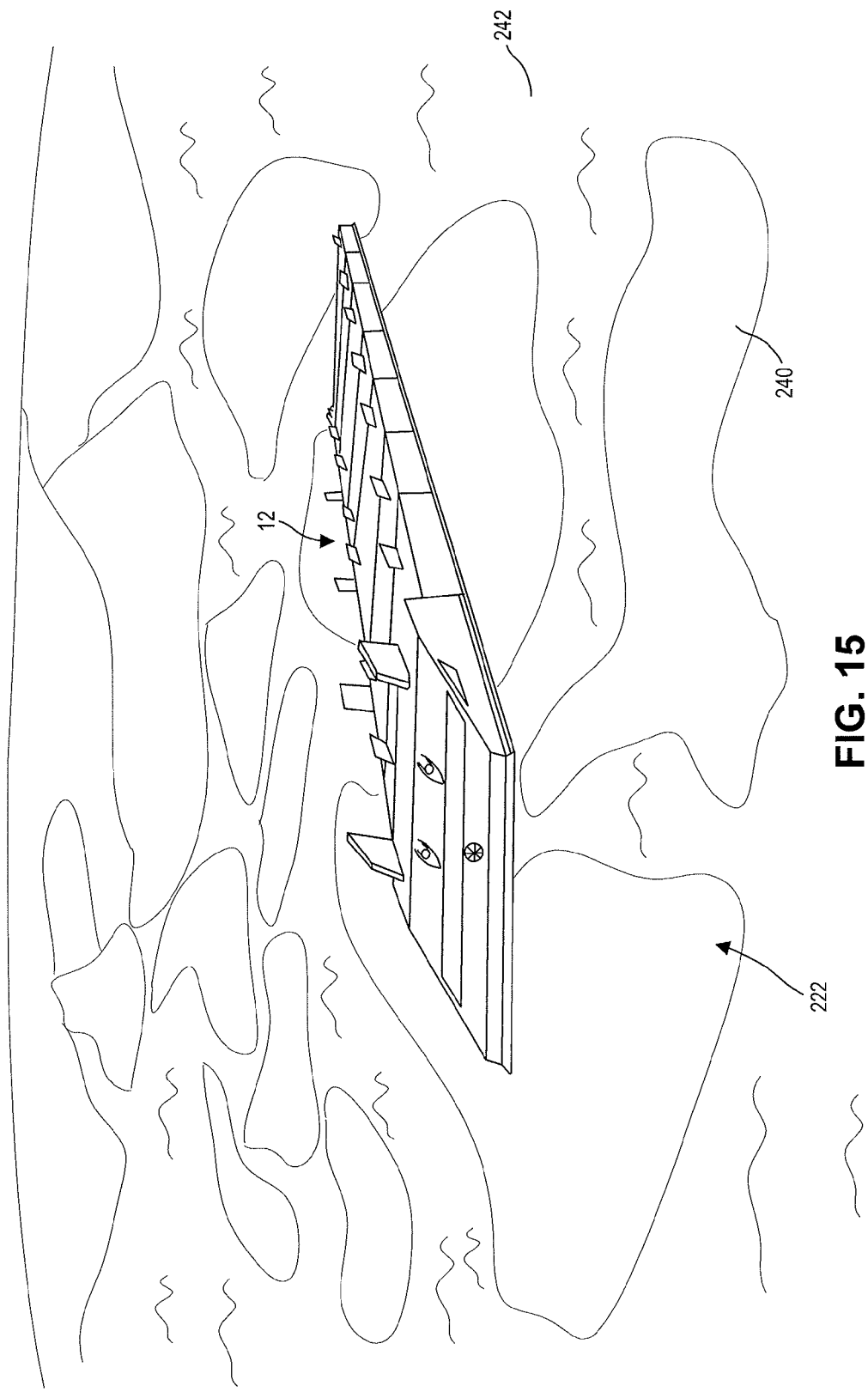
FIG. 15 is another perspective view of the transportation system of FIG. 1.

"Substantially flat surface" means a surface that is suitable for hovercraft use such as, for example, a surface without obstructing protrusions large enough to cause significant pressurized air to escape from under inflated bead 86 so that hovering is significantly disrupted and causing, for example, a bottom of bead 86 to drag on the ground. For example, substantially flat surface 230 may include solid ground and ice without obstructing protrusions, a surface of water, and a surface of a swamp. For example, as depicted in FIG. 14, substantially flat surface 230 may include a ground surface 236 and/or a water surface 238. Also for example, as depicted in FIG. 15, substantially flat surface 230 may include an ice surface 240 and/or an arctic water surface 242. Thus, lanes 222 may have substantially flat solid and/or liquid surfaces. Also, lane 222 may include a liquid body having a substantially flat liquid surface, e.g. surfaces 238 and 242, and may include a solid body having a substantially flat solid surface, e.g., surfaces 236 and 240.

Figure 16:
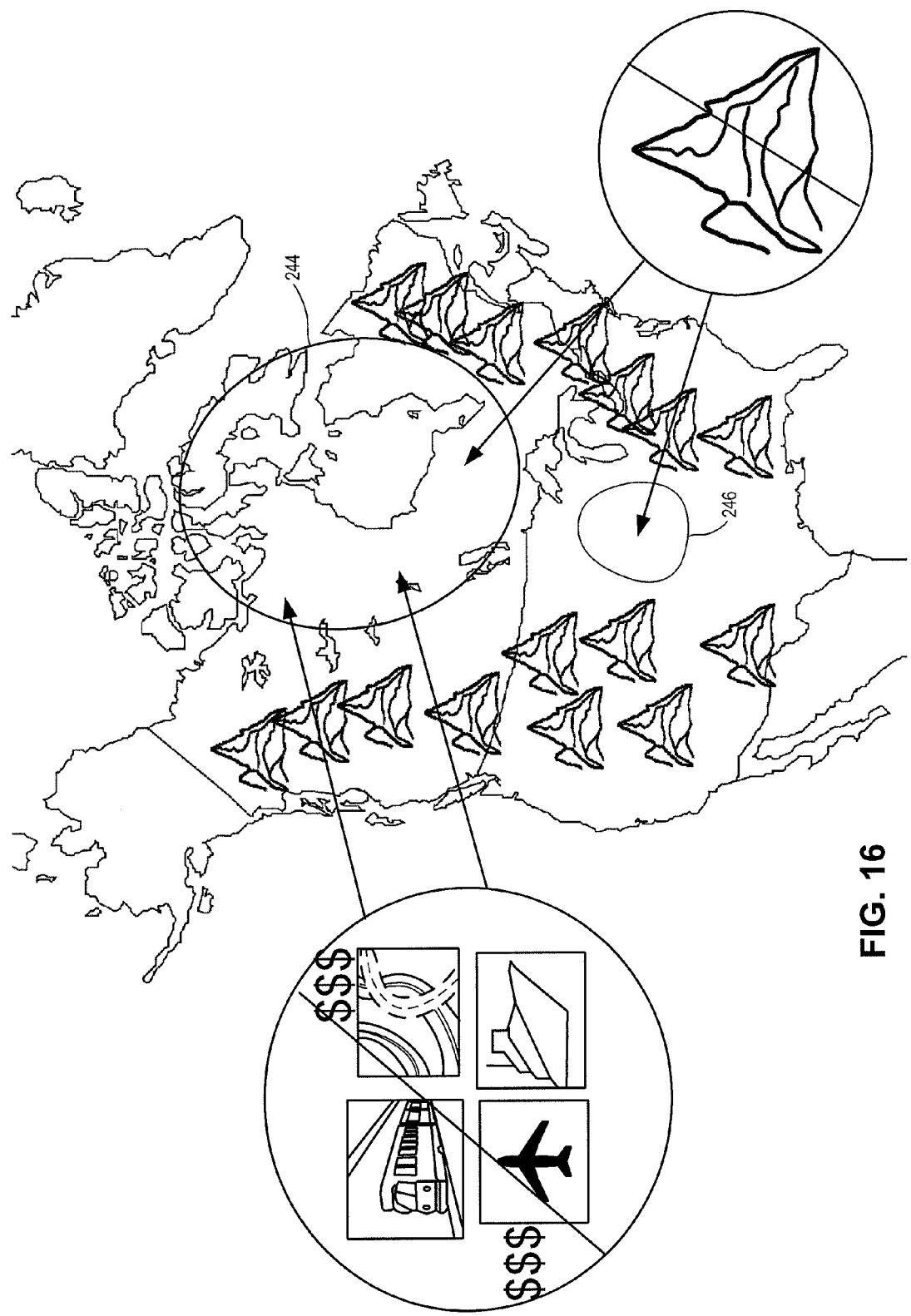
FIG. 16 is a schematic view of an exemplary geographic area of use for the transportation system of FIG. 1.

As depicted in FIG. 16, support system 14 may include lanes 222 located in areas of the world having significant amounts of substantially flat surfaces 230 such as, for example, tundra area 244 and plains area 246. Also, for example, lanes 222 may be located in areas having little conventional transportation infrastructure, such as tundra area 244 having vast areas lacking conventional rail, highways, airstrips, and/or ice-free shipping lanes.

Referring to FIG. 13, guidance system 224 of support system 14 may include a plurality of guidance devices 248. Guidance devices 248 may be ground-mounted devices that may be located at peripheries 234 of substantially flat surface 230 and/or at interior locations of lane 222 on substantially flat surface 230. Guidance devices 248 may also be partially or entirely buried below substantially flat surface 230 and/or partially or entirely buried outside of periphery 234 of lane 222. Guidance devices 248 may also be located below water and/or ice surfaces. Thus, guidance system 224 may include a plurality of guidance devices 248 dispersed on lane 222 and configured to communicate with operators and/or control system 27 of vehicle 12 to guide vehicle 12 between peripheries 234 of lane 222.

Guidance devices 248 may be any suitable device for guiding vehicle 12 such as, for example, a sensor and/or a global positioning system (GPS) device. For example, each guidance device 248 may also include a device configured to send and receive sensed operation data from vehicle 12. For example, guidance device 248 may include transponders, receivers, transmitters, and/or interrogation devices configured to communicate with communication devices of control system 27 of vehicle 12. For example, guidance device 248 may be interrogated by a communication device aboard a passing vehicle 12, and may provide operation data such as location data to control system 27 and/or an operator of vehicle 12. Guidance device 248 may provide any suitable type of data to vehicle 12 such as, for example, GPS and/or elevation data, ambient condition data such as temperature, motion detection data of obstructions within lane 222, image data, and/or data regarding a maintenance condition of lane 222. Guidance devices 248 and communication devices of control system 27 aboard vehicle 12 may communicate via any suitable means such as, for example, radio, microwave line-of-sight, laser optics, and/or wireless communication. Guidance devices 248 may be dispersed intermittently along lane 222. Guidance devices 248 may thereby communicate with vehicle 12 to continuously provide operators and/or control system 27 of vehicle 12 with data for maneuvering vehicle 12.

In addition to guidance devices 248, guidance system 224 may also include components located partially or entirely aboard vehicle 12. For example, guidance system 224 may include a memory such as, for example, a computer-readable medium. The memory may store instructions for executing guidance processes of vehicle 12. For example, the memory may store information provided by guidance devices 248 and/or data received directly from satellite and other wireless systems. Guidance system 224 may also include a processor for executing the instructions stored in the memory. The processor may be integrated into control system 27 of vehicle 12. For example, one or more processors of guidance system 224 may provide a geographical route to operators and/or control system 27 of vehicle 12 based on information stored in the memory and provided by both guidance devices 248 and satellite systems, from only guidance devices 248, and/or from only satellite or other wireless systems. Guidance system 224 may thereby store and process operation data for controlling vehicle 12 based on guidance devices 248, and also independent from guidance devices 248 via wireless systems.

Vehicle 12 of hovering vehicle system 10 may operate with the support of support system 14. An exemplary operation of hovering vehicle system 10 is described below.

Vehicle 12 may begin operation in a shut-down state at station 220. As depicted in FIGS. 4 and 12, passengers and/or materials may be unloaded from vehicle 12 into facility 226 via door assemblies 46 and 100 of modules 28, 30, and/or 32. Additionally, passengers and/or materials may be loaded from facility 226 into vehicle 12 via door assemblies 46 and 100 of modules 28, 30, and/or 32. Vehicle 12 may be supported on pad 228 of station 220 via strut systems 77 and 110 of modules 28, 30, and 32. Energy system 22 may operate to supply the various systems of vehicle 12 with power. Energy collectors 194 and/or power sources of horizontal thrust system 18 and vertical thrust system 20 may operate to provide power to the various systems of vehicle 12 via energy system 22.

After personnel and/or materials are loaded, operators and/or control system 27 of vehicle 12 may operate vertical thrust system 20. One or more power sources 188 of some or all of vertical thrust subsystems 186 of modules 28, 30, and 32 will drive one or more fans 192 via respective shafts 190. As depicted in FIGS. 5 and 6, fans 192 will pressurize air in cavities 82 of plenums 74 and 106 of modules 28, 30, and 32. The pressurized air contained in plenums 74 and 106 will be urged by fans 192 into bead interior 90 of beads 86, thereby inflating beads 86 of modules 28, 30, and 32. As beads 86 continue to be inflated, the bottom portions of beads 86 will bear against pad 228, and strut systems 77 and 110 of modules 28, 30, and 32 will eventually be lifted off of pad 228 as beads 86 begin to support an entire weight of vehicle 12. As beads 86 rest on pad 228, space 88 will be formed between a surface of beads 86, an upper surface of pad 228, and a bottom surface of lower walls 80 of plenums 74 and 106 of modules 28, 30, and 32. As beads 86 become substantially inflated, fans 192 will urge pressurized air from cavities 82 of plenums 74 and 106 into space 88 via apertures 84, thereby increasingly pressurizing the air in space 88. Fans 192 will continue to urge pressurized air into space 88 until the pressure of the air in space 88 becomes high enough to overcome gravitational forces due to the weight of vehicle 12, thereby urging beads 86 of vehicle 12 off of the ground and allowing some of the highly pressurized air in space 88 to escape. Fans 192 may thereby operate to form an air cushion 250 (i.e., a continuous curtain or jet of pressurized air) between a bottom of beads 86 of modules 28, 30, and 32 and pad 228, as some pressurized air continuously escapes from space 88. An annular ring of airflow, or a momentum curtain, may thereby be produced by beads 86, providing lift based on the pressurized air in space 88. Operators and/or control system 27 may vary air cushion 250 via control of fans 192 of vertical thrust system 20. Vehicle 12 may thereby hover over pad 228, supported by air cushion 250. Although remaining substantially stationary above pad 228, hovering vehicle 12 may not be in direct contact with pad 228 while hovering. Air cushion 250 also provides an effective suspension system for vehicle 12. Air cushion 250 may also be generated against substantially flat surfaces 230 away from station 220, e.g., when vehicle 12 for some reason has been stopped in a shut-down state on lane 222 between stations 220.

As vehicle 12 hovers above pad 228, operators and/or control system 27 may operate horizontal thrust system 18. Turbofan engines 130 of forward thrust subsystem 122 may be activated and operated to produce forward thrust to move vehicle 12 in direction of travel 34. Vehicle 12 may move away from station 220 and pad 228, and may move over substantially flat surface 230 of lane 222. Because vehicle 12 is supported by air cushion 250, turbofans 130 may move vehicle 12 substantially without resistance from frictional forces produced by contact between vehicle 12 and pad 228 and/or substantially flat surface 230. Operators and/or control system 27 of vehicle 12 may control the thrust generated by forward thrust subsystem 122 to control a speed of vehicle 12 in direction of travel 34. Vehicle 12 may thus be a self-powered vehicle that is configured to generate air cushion 250 on substantially flat surface 230, and move over substantially flat surface 230 on air cushion 250.

As depicted in FIGS. 11 and 13, vehicle 12 moves while hovering in direction of travel 34 over substantially flat surface 230, along lane 222. As depicted in FIGS. 14 and 15, vehicle 12 hovers over land, ice, and/or water as it moves over support system 14, e.g., ground surface 236, water surfaces 238 and 242, and ice surface 240, as well as other substantially flat surfaces such as swampland.

As vehicle 12 moves along lane 222, operators and/or control system 27 aboard vehicle 12 communicate with guidance system 224. Operators and/or control system 27 receive operating data (e.g., GPS data, temperature, motion detection data, image data, maintenance condition data, and ambient condition data) from guidance devices 248 and/or wireless networks (e.g., satellite systems). Operators and/or control system 27 use the data received from and/or processed by guidance system 224 to control maneuvering of vehicle 12 and the various systems of vehicle 12. For example, if vehicle 12 moves close to periphery 234 of lane 222, guidance system 224 will provide corresponding data and output to operators and/or control system 27 describing the operation status of vehicle 12. Operators and/or control system 27 may make corresponding operating adjustments to vehicle 12 (e.g., maneuver vehicle 12 away from periphery 234). Operators and/or control system 27 may thereby communicate with guidance system 224, which is configured to guide vehicle 12 between peripheries 234 of trackless lane 222, to maneuver vehicle 12.

Operators and/or control system 27 operate maneuver subsystem 126 of horizontal thrust system 18 to maneuver vehicle 12 on support system 14. Operators and/or control system 27 control rudders 129 to steer vehicle 12. Operators and/or control system 27 control some or all of rudders 129, either independently, partially in unison, or in unison, to rotate to increase and/or decrease a surface area of rudder 129 impacted by flowing air as vehicle 12 moves. The resulting increasing and decreasing forces applied to rudders 129 disposed on varying parts of vehicle 12 influence a direction in which modules 28, 30, and/or 32 will be urged. Operators and/or control system 27 may thereby steer vehicle 12 along lanes 222 of support system 14 manually and/or using algorithms designed to rotate rudders 129 based on a desired steering direction of modules 28, 30, and/or 32.

As a varying rotation of rudders 129 steers hovering vehicle 12 on support system 14, linkage assemblies 127 displace as depicted in FIGS. 8 and 9. Flexible bearing 170 expands and contracts based on relative movement of modules 28, 30, and/or 32. For example, when vehicle 12 turns, gap 181 expands at a side portion 182 and contracts at a side portion 184, and slanted surfaces 180 of aperture 168 provide sufficient clearance so that protrusion 166 is not obstructed by aperture 168.

As vehicle 12 hovers over substantially flat surface 230 of lane 222, operators and/or control system 27 may operate dispensing system 26. When dispensing system 26 is activated, dispenser 200 dispenses fill 198 stored in housing 196 onto substantially flat surface 230. Dispensing system 26 thereby sprays lime, cement, lime-fly ash, fly ash, smooth aggregate, coarse aggregate, and/or water onto lane 222 as vehicle 12 hovers over substantially flat surface 230. As various vehicles 12 pass over lanes 222, the sprayed lime, cement, lime-fly ash, fly ash, smooth aggregate, coarse aggregate, and water increase the smoothness of substantially flat surface 230. Also, the pressure exerted by air cushion 250 contributes to the improvement of substantially flat surface 230, making substantially flat surface 230 smoother and increasingly level. Because air cushions become more efficient as the supporting surface becomes smoother, the operation of dispensing system 26 improves the efficiency of vehicles 12 by causing substantially flat surface 230 to be an increasingly smooth, flat, and level surface.

Operators and/or control system 27 may activate reverse thrust subsystem 124 of horizontal thrust system 18 to stop vehicle 12. In order to exert reverse thrust, thrust levers 158 of thrust reversers 156 may move to the open position 160 depicted in FIG. 7, thereby closing bypass 150, and ejecting the previously bypassing airflow out of bypass 150 in direction 162 to produce thrust partially opposing the forward thrust produced by power source 128 of forward thrust subsystem 122. The forward thrust being produced by power source 128 in direction of travel 34 may be reduced and power source 128 may also be powered off. Additionally, power source 154 of reverse thrust subsystem 124 is activated to produce thrust to urge vehicle 12 in a direction that is substantially opposite to direction of travel 34. As vehicle 12 stops, flexible bearings 170 of linkage assemblies 127 contract as gap 181 contracts, as depicted in FIG. 10. Because protrusions 166 are received within apertures 168, and linkage assemblies 127 are compressed during braking, horizontal stability of vehicle 12 may be improved. For example, detrimental results of braking such as jack-knifing are substantially prevented.

Operators and/or control system 27 may stop vehicle 12 and set it down at anytime, for example, at another station 220 or at a ground surface 236 of support system 14. After reverse thrust subsystem 124 has substantially stopped vehicle 12, vertical thrust subsystem 186 may be controlled to control fans 192 to reduce the amount of pressurized air directed into space 88, depicted in FIGS. 5 and 6. The pressure of the air in space 88 decreases until air cushion 250 dissipates and a bottom of bead 86 contacts substantially flat surface 230 and/or pad 228, thereby supporting the weight of vehicle 12. Fans 192 continue to decrease the pressure of air within plenums 74 and 106 of modules 28, 30, and 32 until the pressure of air within bead interior 90 decreases, allowing beads 86 to deflate. Fans 192 continue to decrease operation and/or stop, continuing to deflate beads 86, until strut systems 77 and 110 of modules 28, 30, and 32 contact substantially flat surface 230 and/or pad 228. Once beads 86 become substantially deflated, strut systems 77 and 110 will support an entire weight of vehicle 12. If vehicle 12 is at station 220, passengers and/or materials to be transported may be again loaded and/or unloaded from facility 226 into vehicle 12 via door assemblies 46 and 100 of modules 28, 30, and 32.

Several benefits may be associated with hovering vehicle system 10. Because hovering vehicle system 10 requires little man-made infrastructure, significant infrastructure costs associated with conventional transportations systems may be avoided (e.g., rail lines, bridges, and electrical distribution systems for tracks). Hovering vehicle system 10 may provide transportation in areas where conventional transportation systems are limited (e.g., partially frozen water bodies, remote areas lacking roads and other conventional transportation links, swampland, arctic areas, desert, and areas having a patchwork of land and water). For example, hovering vehicle system 10 may provide an economical transportation system for rural plains, arctic areas, tundra, partially or fully frozen water bodies, and water bodies that are partially or fully un-navigable because of ice. For example, hovering vehicle system 10 may provide commercially viable transportation in relatively flat, sparsely populated areas such as, for example, parts of the U.S. Midwest, Australia, Canada, and Russia. Also, hovering vehicle system 10 may provide a transportation system that improves its infrastructure during operation through an operation of dispensing system 26.

It will be apparent to those skilled in the art that various modifications and variations can be made to the disclosed apparatus and method. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A transportation system comprising:
a self-powered vehicle comprising:
 a hood assembly comprising:
  a hood including an inflatable bead; and
  a plenum including one or more substantially horizontal upper walls and one or more substantially horizontal lower walls provided substantially in parallel to the upper walls, the lower walls including one or more apertures allowing pressurized air to be directed from the plenum to the inflatable bead;
 a vertical thrust system configured to generate an air cushion on a trackless lane having a substantially flat surface; and
 a dispensing system disposed substantially within the hood assembly and configured to dispense a surface improving material from the vehicle onto the substantially flat surface while the vehicle is traveling over the surface on the air cushion; and
 a guidance system configured to guide the vehicle between peripheries of the trackless lane,
wherein:
 the vehicle comprises a train including a plurality of modules, each module including a separate hood assembly,
 each module is connected to at least one other module by a linkage assembly, the linkage assembly includes a protrusion extending from an end of a first module and an aperture formed at an end of a second module and configured to receive the protrusion, the protrusion includes a first surface that extends perpendicular to a length of the train;

the aperture ends at a second surface that extends perpendicular to the length of the train, and the protrusion is configured to close a gap between the first surface and the second surface until the first surface abuts the second surface when the first module moves toward the second module.

2. The transportation system of cairn 1, wherein the vehicle comprises a housing formed from materials including carbon fiber.

3. The transportation system of claim 2, wherein the vehicle housing comprises one of carbon fiber-reinforced polymer or carbon fiber-reinforced plastic.

4. The transportation system of claim 1, wherein the linkage assemblies are configured such that, during operation of the train, a portion of the first surface is bested outside of the aperture and another portion of the first surface is located inside the aperture.

5. The transportation system of claim 1, wherein the linkage assemblies comprise flexible bearings disposed between the plurality of modules and are configured to undergo large elastic displacements relative to the dimensions of the flexible bearing.

6. The transportation system of claim 5, wherein the flexible bearing contracts during braking of the vehicle.

7. The transportation system of claim 1, wherein the vehicle is self-powered by at least one of carbonized fossil fuel, a plurality of solar energy collectors, and a plurality of thermal energy collectors.

8. The transportation system of claim 1, wherein the vehicle is self-powered by one or both of solar energy collectors and thermal energy collectors, and wherein the one or both of solar energy collectors and the thermal energy collectors include flexible elements that are adhered to an exterior surface of the vehicle.

9. The transportation system of claim 1, wherein the plurality of modules includes:

a first module that includes a horizontal thrust assembly and a vertical thrust assembly; and a second module that includes a vertical thrust assembly and does not include a horizontal thrust assembly.

10. A method for operating a vehicle comprising:

self-powering the vehicle with at least one of carbonized fossil fuel, solar energy, and thermal energy;

generating an air cushion between a bottom of the vehicle and a substantially flat surface of a trackless lane, wherein generating the air cushion includes:

generating pressurized air in a plenum including one or more substantially horizontal upper walls provided beneath a vehicle housing and one or more substantially horizontal lower walls provided substantially in parallel to and beneath the upper walls, the lower was including one or more apertures; and directing the pressurized air from the plenum to an inflatable bead of a hood via the one or more apertures provided in the lower walls;

dispensing a surface improving material from the vehicle onto the substantially flat surface while moving the vehicle over the substantially flat surface on the air cushion, the dispensed surface improving material creating a new surface on top of the substantially flat surface that is smoother than the substantially flat surface; and communicating with a guidance system to guide the vehicle between peripheries of the trackless lane, including sending and receiving sensed operational data between a plurality of guidance devices dispersed on the trackless lane and the vehicle.

11. The method of claim 10, wherein dispensing the surface improving material comprises urging the surface improving material through an orifice under pressure.

12. The method of claim 11, wherein the surface-improving material comprises at least one of cement, lime-fly ash, fly ash, smooth aggregate, and coarse aggregate.

13. The method of claim 10, wherein generating the air cushion comprises driving a fan to pressurize air located in a plenum of the vehicle.

14. The method of claim 13, further comprising forcing pressurized air located in the plenum into an inflatable bead and into a space located between the vehicle and the substantially flat surface.

15. The method of claim 10, further comprising horizontally moving the vehicle in a direction of travel by applying a first horizontal thrust.

16. The method of claim 15, further comprising stopping the vehicle by thrust reversal and applying a second horizontal thrust to urge the vehicle in a direction substantially opposite to the direction of travel.

17. The method of claim 16, operating a turbofan to apply at least one of the first horizontal thrust and the second horizontal thrust.

18. A transportation system comprising:

a self-powered vehicle comprising:

a housing;

a hood assembly comprising:

a hood including an inflatable bead; and a plenum including one or more substantially horizontal upper walls provided beneath the housing and one or more substantially horizontal lower walls provided substantially in parallel to and beneath the upper walls, the lower walls including one or more apertures allowing pressurized air to be directed from the plenum to the inflatable bead;

a vertical thrust system configured to generate an air cushion on a trackless lane that has a liquid body having a substantially flat surface and a solid body having a substantially flat surface;

a dispensing system disposed substantially within the hood assembly and configured to dispense a surface improving material from the vehicle onto the substantially flat surface while the vehicle is traveling over the substantially flat surfaces of the liquid and solid bodies on the air cushion; and a guidance system comprising a plurality of guidance devices dispersed on the trackless lane and configured to communicate with the vehicle to guide the vehicle between peripheries of the trackless lane, each guidance device configured to send and receive sensed operation data to and from the vehicle, wherein the guidance system further comprises a wireless system configured to communicate and control the vehicle independent of the plurality of guidance devices.

19. The transportation system of claim 18, wherein the guidance system communicates to the vehicle at least one of GPS data, elevation data, ambient condition data, motion detection data of obstructions within the trackless lane, image data, or maintenance condition data.

20. The transportation system of claim 18, wherein the guidance system communicates with the vehicle via one or more of radio, microwave line-of-sight, laser optics, and wireless communication.

\* \* \* \* \*